United States Patent [19]
Huang

[11] Patent Number: 5,507,366
[45] Date of Patent: Apr. 16, 1996

[54] CONTROL BOARD ASSEMBLY FOR ELEVATOR

[76] Inventor: Chen-Hwa Huang, 58, Ma Yuan West St., Taichung, Taiwan

[21] Appl. No.: 311,948

[22] Filed: Sep. 26, 1994

[51] Int. Cl.⁶ ..................................................... B66B 1/34
[52] U.S. Cl. ........................................ 187/395; 187/397
[58] Field of Search ................................... 187/395, 397, 187/414, 391, 398, 399; 340/332, 286.11, 815.53

[56] References Cited

FOREIGN PATENT DOCUMENTS 0190407  8/1986  European Pat. Off. ............... 187/397

Primary Examiner—Kenneth Noland

[57] ABSTRACT

A control board for an elevator includes a pair of edge members each having a longitudinal slot. A number of boards and plates are engaged between the edge members for engaging with buttons and displayer and include side edges engaged in the slots of the edge members. The boards and the plates may be arranged or changed for fitting different buttons and displayer. Two panels are further engaged between the upper and the lower portions of the edge members for positioning the board and the plate.

1 Claim, 6 Drawing Sheets

CONTROL BOARD ASSEMBLY FOR ELEVATOR

BACKGROUND OF THE INVENTION (a) Field of the Invention

The present invention relates to a control board, and more particularly to a control board assembly for elevators.

(b) Description of the Prior Art

Typical elevators comprise a control board for controlling the elevators. One type of the control boards is disclosed in FIGS. 1 and 2 and comprises a board body 10 including an oblong hole 11 formed in the upper portion for engaging with a displayer 13 which shows the layers of the building and including two apertures 12 formed in the lower portion for engaging with press buttons 14 which are provided for controlling the elevators. Another type of control board is disclosed in FIG. 3 and comprises a board body 20 including an aperture 23 for engaging with a displayer 26 for showing the position of the elevator and including a plurality of orifices 21, 22 for engaging with press buttons 24, 25 respectively. The press buttons 24, 25 are provided for controlling the elevators.

However, in such control boards, once the oblong hole 11, apertures 12, 23 and the orifices 21, 22 are punched and formed in the board body 10, 20, both the size and the shape of the apertures and the orifices may not be changed such that only predetermined buttons or displayers may be engaged in the apertures and orifices. In addition, once the board body 10, 20 is damaged, the whole board body is required to be replaced with a brand new one.

The present invention has arisen to mitigate and/or obviate the afore-described disadvantages of the conventional control boards for elevators.

SUMMARY OF THE INVENTION

The primary objective of the present invention is to provide a control board for elevators in which the configuration of the control board may be changed freely according to the users requirement.

In accordance with one aspect of the present invention, there is provided a control board assembly comprising a pair of edge members each including a slot longitudinally formed therein, at least one board engaged between the edge members for engaging with buttons and including side edges engaged in the slots of the edge members; at least one plate engaged between the edge members for engaging with displayer and including side edges engaged in the slots of the edge members. The board and the plate being arranged or changed for fitting the buttons and displayer. Two panels are further engaged between the upper and the lower portions of the edge members for positioning the board and the plate.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
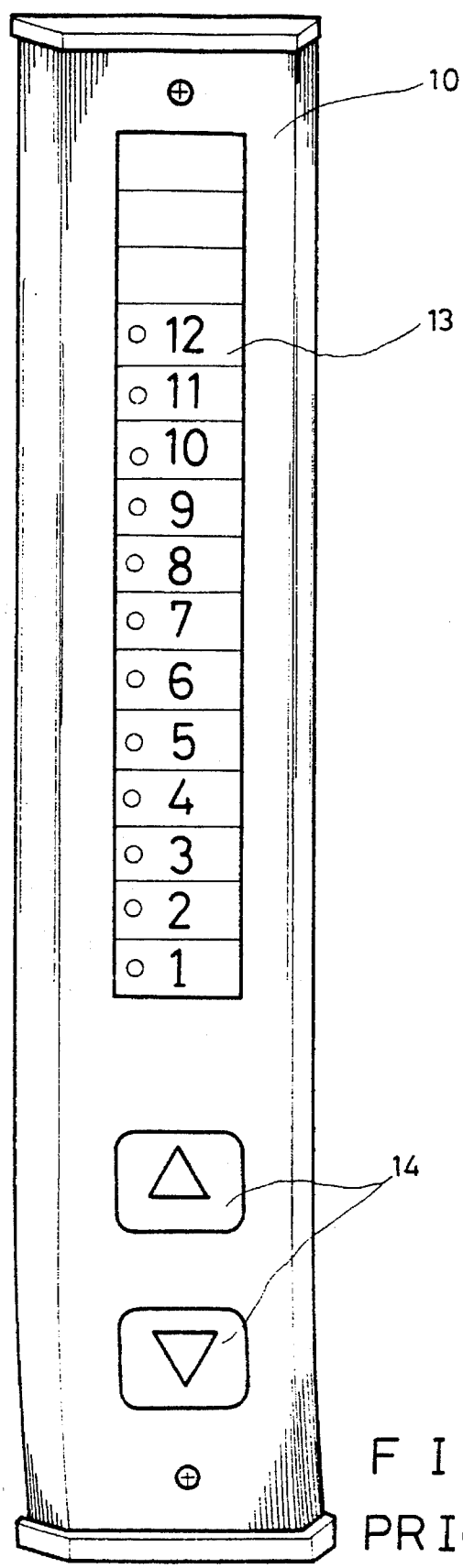
FIG. 1 is a front view of a typical control board for elevators.
Figure 2:
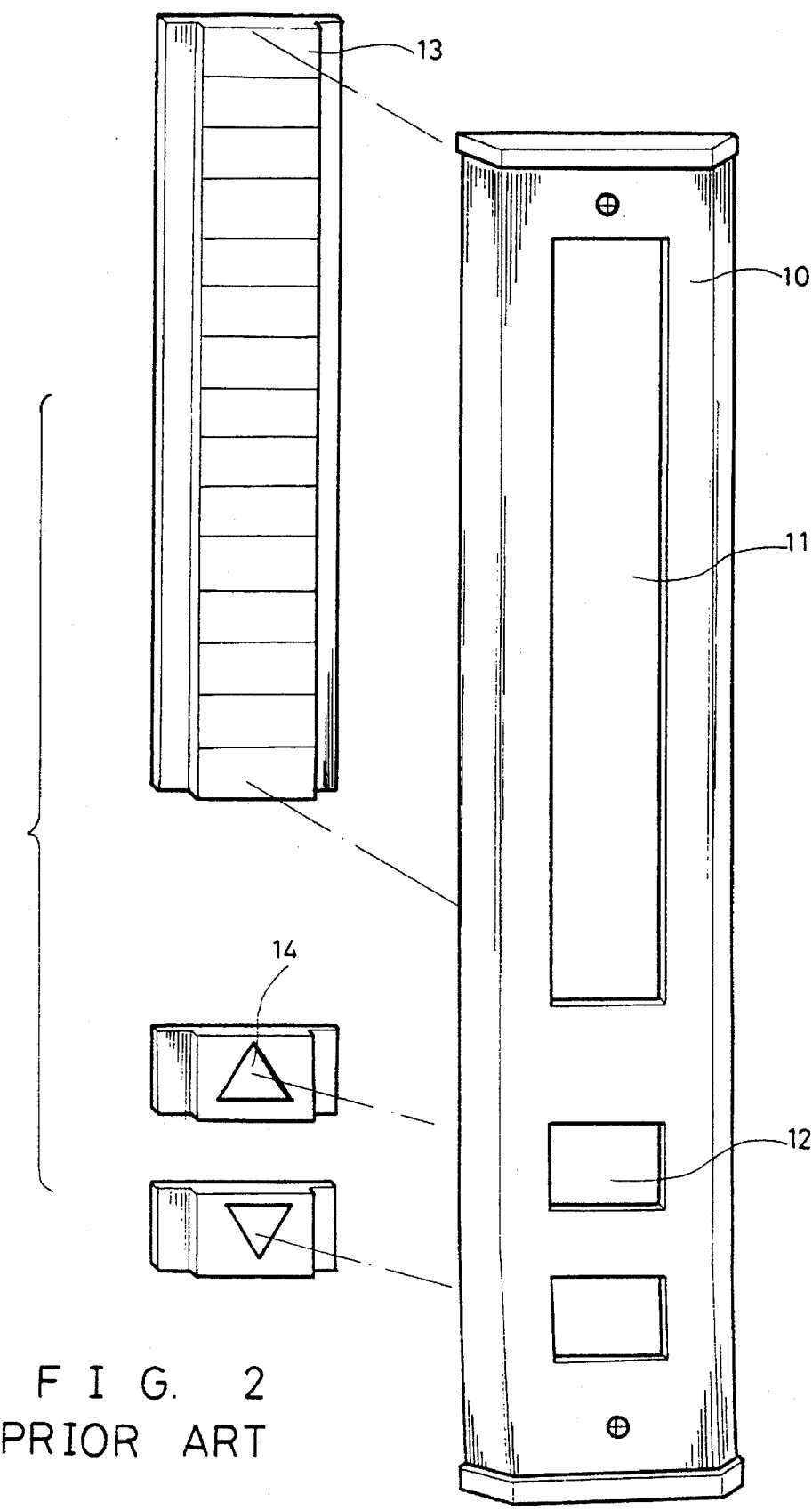
FIG. 2 is an exploded view of the control board as shown in FIG. 1.
Figure 3:
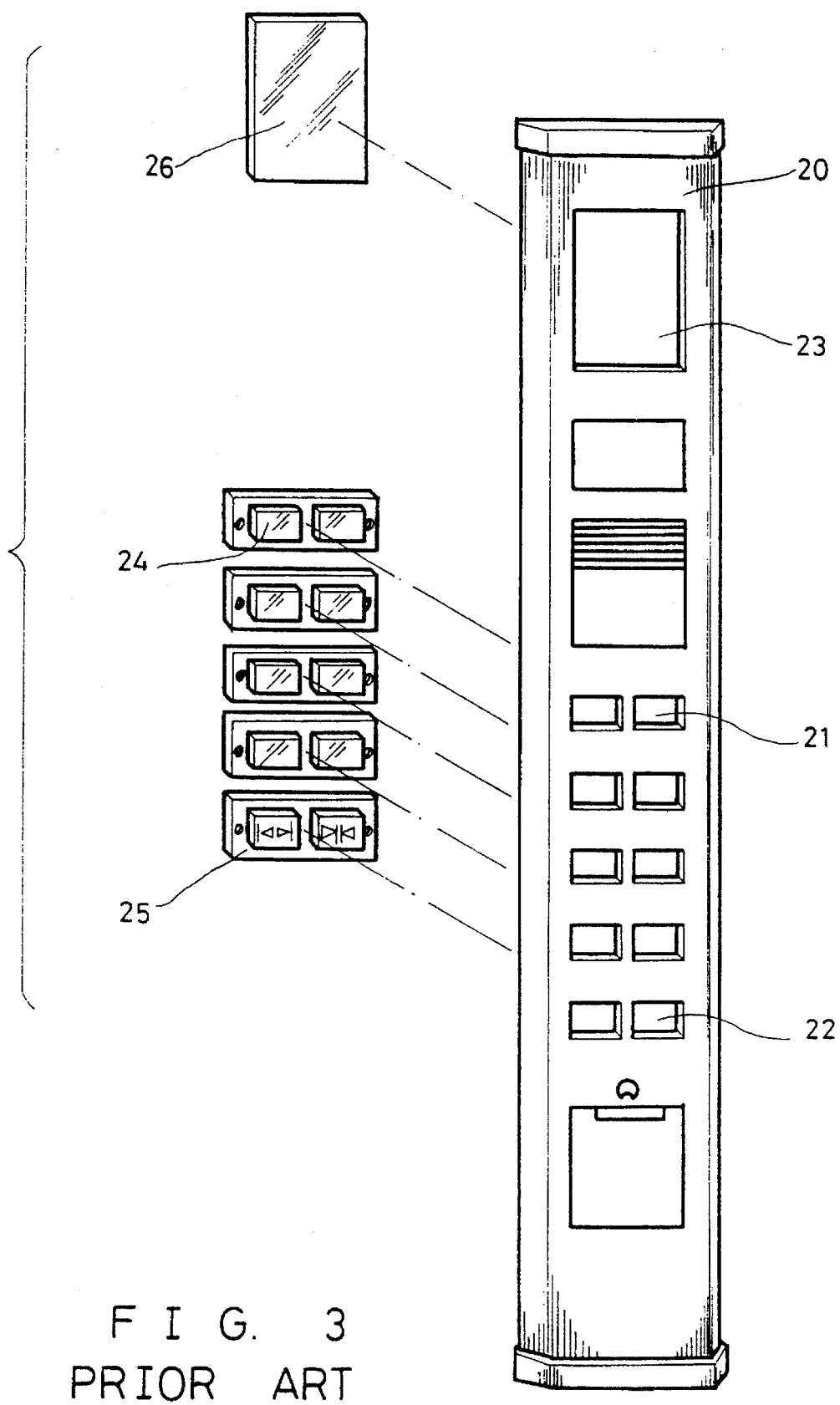
FIG. 3 is an exploded view showing another typical control board for elevators.
Figure 4:
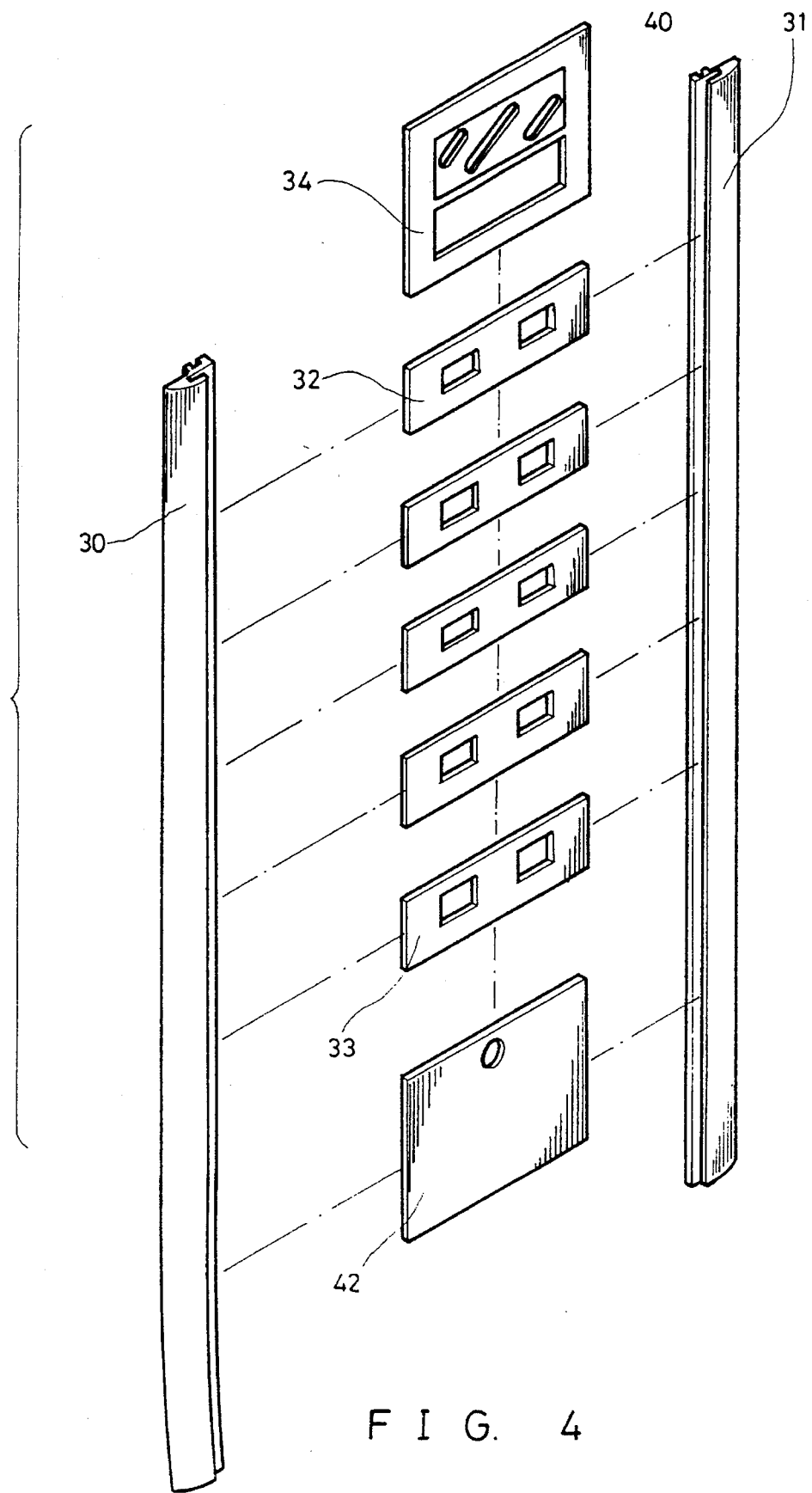
FIG. 4 is an exploded view of a control board assembly in accordance with the present invention.
Figure 5:
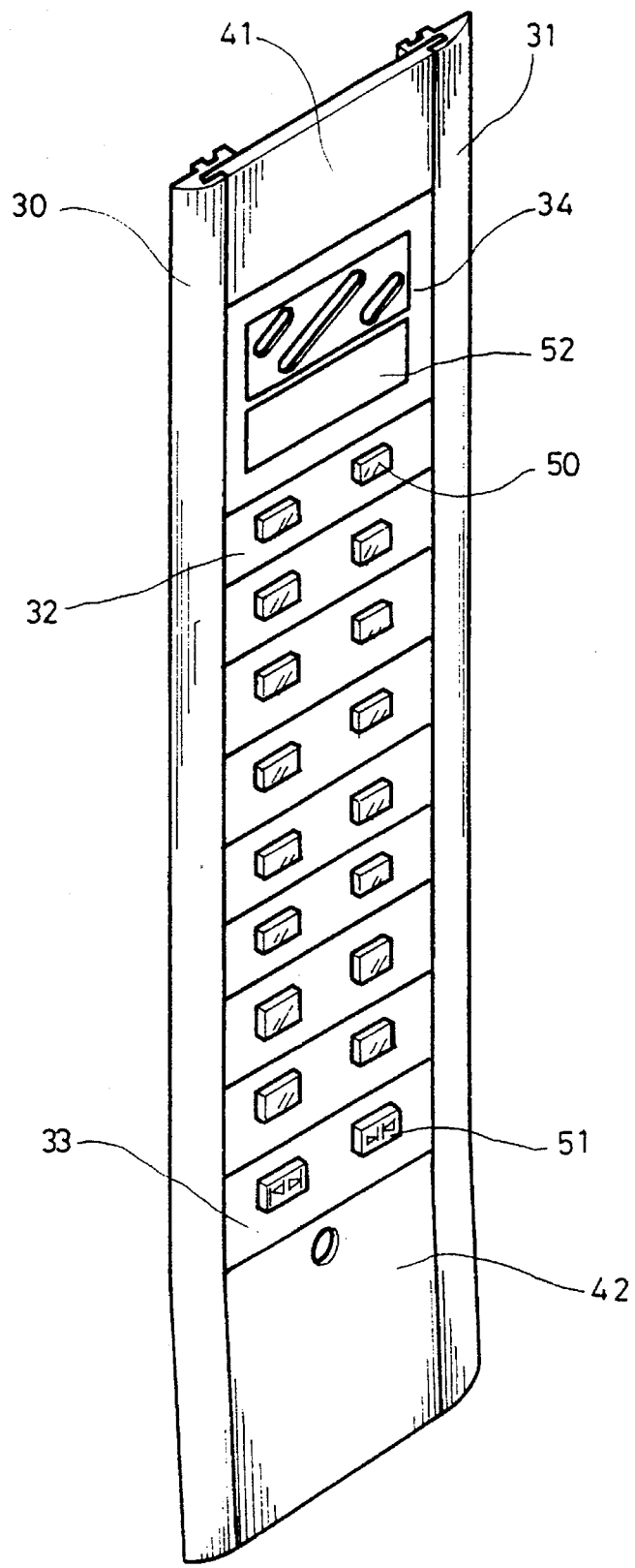
FIG. 5 is a perspective view of the control board assembly.

Referring to the drawings and initially to FIGS. 4 and 5, a control board assembly in accordance with the present invention comprises a pair of edge members 30, 31 disposed in parallel with each other and each including a slot 40 longitudinally formed therein. A number of boards 32, 33 are engaged between the edge members 30, 31 for engaging with buttons 50, 51 respectively and include side edges engaged in the slots 40 of the edge members 30, 31. The buttons 50, are provided for controlling the elevator. A plate 34 is engaged above the boards 32 for engaging with a displayer 52 which shows the position of the elevator. Two panels 41, 42 may be engaged in the upper and lower portion of the edge members 30, 31 for positioning the boards 32, 33 and plate 34 and may be provided for advertising purposes. The boards 32, 33 and the plate 34 may be changed or rearranged for fitting different buttons 50, 51 or displayers 52.

Figure 6:
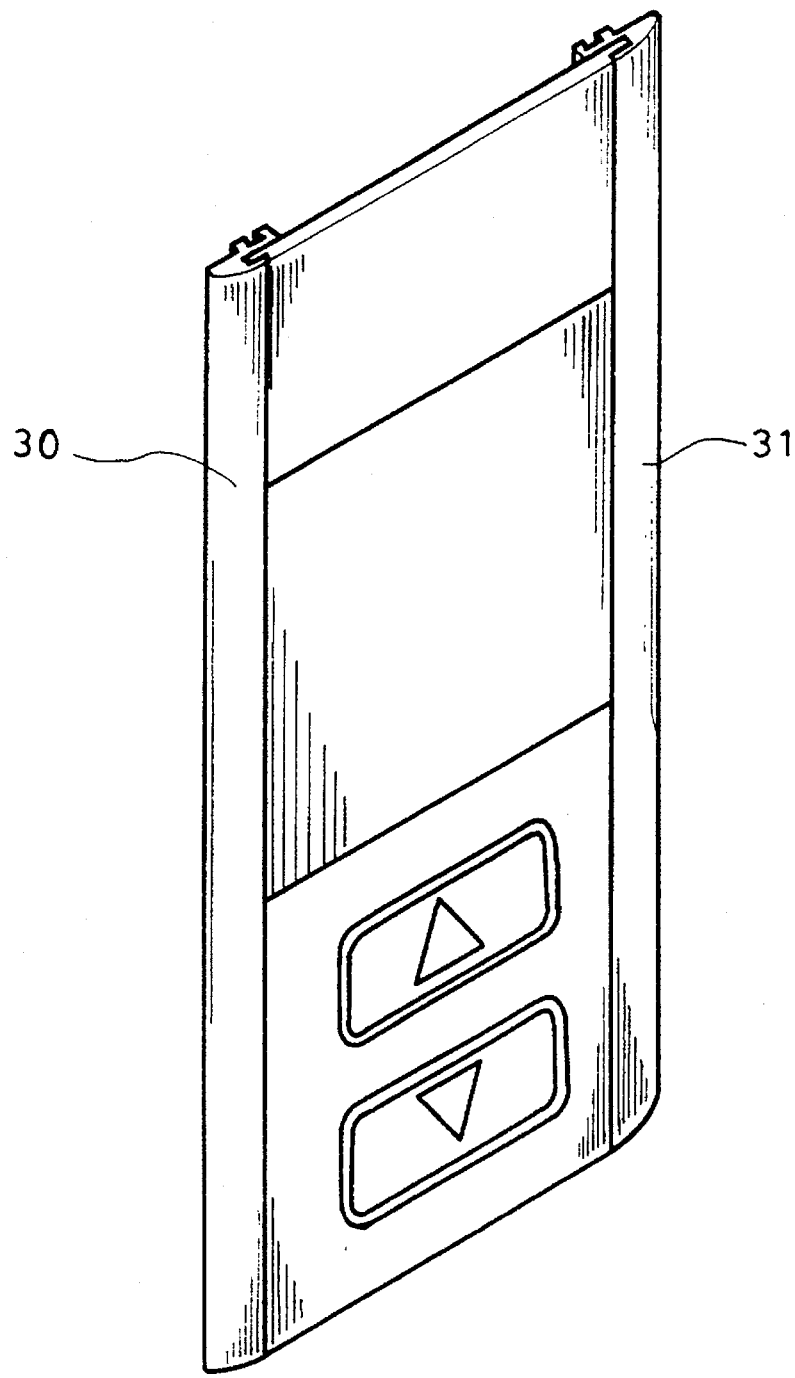
FIG. 6 is a perspective view showing another application of the control board assembly in accordance with the present invention.

Referring next to FIG. 6, boards or plates of larger width may also be suitably engaged between the edge members 30, 31.

Accordingly, the control board assembly in accordance with the present invention includes a configuration that may be freely changed according to the users requirement.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A control board assembly comprising:

a pair of edge members, each of said edge members including a slot longitudinally formed therein;

at least one board engaged between said edge members for engaging with buttons and including side edges engaged in said slots of said edge members;

at least one plate engaged between said edge members for engaging with displayer and including side edges engaged in said slots of said edge members;

said board and said plate being arranged and changed for fitting said buttons and displayer;

at least one panel engaged between said edge members for positioning said board and said plate.

* * * * *